United States Patent Office 3,594,443
Patented July 20, 1971

3,594,443
PROCESS FOR PREPARING LOW MOLECULAR WEIGHT α-OLEFINS
Gisela Henrici Henrici and Salvador Olivé Martin, Zollikerberg, Switzerland, assignors to Monsanto Company, St. Louis, Mo.
No Drawing. Filed May 2, 1969, Ser. No. 821,495
Claims priority, application Switzerland, May 13, 1968, 7,420/68
Int. Cl. C07c 3/10
U.S. Cl. 260—683.15       6 Claims

ABSTRACT OF THE DISCLOSURE

Process for preparing low molecular weight α-olefins having 4 to 50 carbon atoms by reacting ethylene in presence of a solution in an aromatic solvent $RAlCl_2$ and $(RO)_3TiCl$ where R is a 1 to 4 carbon alkyl, the Al to Ti molar ratio is in the range of 2:1 to 10:1, at a temperature in the range of 0 to $-50°$ C., preferably $-10$ to $-50°$ C., at a pressure in the range of 1 to 20 kg./cm.$^2$ and preferably at a titanium compound concentration of $1\times10^{-3}$ to $50\times10^{-3}$ mol/liter of solvent.

---

The present invention relates to a process for preparing low molecular weight α-olefins having 4 to 50 carbon atoms.

The preparation of liquid hydrocarbons by polymerization of ethylene in the presence of anhydrous aluminum chloride is well known. This polymerization proceeds at a satisfactory rate at temperatures between 60 and 280° C., and pressure above 20 atmospheres. However, due to the high reaction temperatures, secondary reactions, such as cracking, isomerization, alkylation and cyclization occur. The products consist mostly of unsaturated aliphatic and hydroaromatic hydrocarbons, whose average molecular weights lie in the range of 80 to 2000. The higher molecular weight oils obtained by this process are useful as lubricants and the lower molecular weight liquids are useful as intermediates for making biodegradable detergents by methods well known in the art, e.g., by alkylation with the olefin of benzene and sulfonation on the benzene ring of the alkylated benzene.

It has also been known how to prepare liquid polyethylenes in the presence of catalyst systems such as $TiCl_4$ or alkylated Ti(IV)-compounds and alkylated aluminum chlorides in a chlorinated solvent. Oligomers having molecular weights of 500 to 3000 are obtained at low temperatures in the range of from $-100$ to $-50°$ C. However, these oligomers consist mainly of 2-ethyl-1-olefins, i.e., they possess vinylidene end groups. This is apparent from the following Tabe I, showing the typical distribution of such oligomers, described in the literature [H. Bestian and K. Clauss, Angew. Chem. 75, 1068 (1963)].

TABLE I.—OLIGOMERIZATION OF ETHYLENE AT $-70°$ C. IN $CH_2Cl_2$
Catalyst: $CH_3TiCl_3/CH_3AlCl_2$; Ti=0.11 mol/liter; Al/Ti=1

| Fraction | Percent referred to converted $C_2H_4$ | Composition |
|---|---|---|
| $C_4$ | 14 | Butene-1. |
| $C_6$ | 39 | 15% hexene-1, 78% 2-ethyl-butene-1. |
| $C_8$ | 21 | 7.5% octene-1, 82% 2-ethyl-hexene-1. |
| $C_{10}$ | 7 | 10% decene-1, 80% 2-ethyl-octene-1. |
| $>C_{10}$ | 19 | Mainly 2-ethyl-1-olefins. |

Highly branched olefins are obtained at temperatures $>-50°$ C. due to secondary reactions.

These and other indications with respect to the ethylene polymerization found in the literature show that up to now it has not been possible to conduct the process in such a manner that low molecular weight olefins having 4 to 50 carbon atoms and bearing an α-vinyl group (α-olefins) will predominantly be formed.

The present process for preparing low molecular weight liquid polyethylenes having preponderantly a vinyl group as an end group, is characterized in that the reaction of ethylene is carried out in the presence of a solution consisting of an aluminum compound of the general formula $RAlCl_2$ and a titanium compound of the general formula $(RO)_3 TiCl$, where R represents an alkyl group having 1 to 4 carbon atoms, in a molar ratio of from 2:1 to 10:1 aluminum to titanium, in an aromatic solvent, at a temperature in the range of about 0 to $-50°$ C., preferably in the range of from $-10$ to $-50°$ C., and at a pressure in the range of from 1 to 20 kg./cm.$^2$. The concentration of titanium compound, as a rule, amounts to $1\times10^{-3}$ to $50\times10^{-3}$ mol per liter of solvent.

In a preferred embodiment of the process of invention, a solution of ethyl aluminum dichloride and triethoxy titanium chloride, in a molar ratio of 7:1, in toluene aluminum to titanium, is used as the catalytic system, at a temperature in the range of from $-17$ to $-23°$ C. and at a pressure in the range of from 6 to 12 kg./cm.$^2$, the concentration of the titanium compound, as a rule, being preferably about $20\times10^{-3}$ mol per liter of solvent.

In the following description, the relation between temperature, ethylene pressure, ethylene conversion and Al/Ti ratio will be explained in detail.

The catalyst is an electron donator-acceptor complex (EDA complex) between the alkylated titanium compound and the aromatic solvent. The alkyl aluminum dichloride serves to alkylate the titanium compound and probably is also a constituent of the complex.

TABLE II.—INFLUENCE OF TEMPERATURE

Concentration (Ti) = $20\times10^{-3}$ mol per liter; Al/Ti=5
Solvent=Toluene
Pressure=12 kg./cm.$^2$

| Run No. | T., ° C. | Time, hrs. | Conversion,[a] mol/liter | $C_8$,[b] percent | $\leq C_{10}-C_{50}$ percent | Insol., percent | Percent mols bearing a vinyl group | |
|---|---|---|---|---|---|---|---|---|
| | | | | | | | $\leq C_8$ | $C_{10}-C_{50}$ |
| 1 | $-20$ | 1 | 13.0 | 32.0 | 67.1 | 0.9 | $\geq 90$ | $\simeq 85$ |
| 2 | $-45$ | 4 | 15.3 | 54.6 | 43.5 | 1.9 | $\geq 90$ | $\simeq 90$ |

[a] Total conversion of ethylene.
[b] In percent of converted ethylene.

More lower molecular weight products are formed at lower temperatures, which is desirable. However, the reaction rate is lower at lower temperatures. In order to reach about the same conversion, 4 hours are needed at −45° C. and only 1 hour at −20° C. Higher pressures than about 12 atmospheres may be employed at temperatures below −20° C.

In the runs described in the Tables II to VII, a solution of $C_2H_5AlCl_2 + (C_2H_5O)_3TiCl$ has been used.

TABLE III.—RUN NO. 1

| Molecular weight: | Approx. No. of C atoms | Percent Based on total conversion | Mols bearing a vinyl group |
|---|---|---|---|
| 56 | $C_4$ | 2.3 | ≃100 |
| 84 | $C_6$ | 13.7 | ≥95 |
| 112 | $C_8$ | 16.0 | ≥95 |
| 150 | $C_{10}$ | 2.0 | ≥90 |
| 175 | $C_{12}$ | 12.0 | ≥90 |
| 195 | $C_{14}$ | 6.7 | ≥90 |
| 215 | $C_{15}$ | 8.0 | ≥90 |
| 225 | $C_{16}$ | 9.5 | ≥80 |
| 292 | $C_{21}$ | 13.4 | ≥70 |
| 265 | $C_{33}$ | 15.4 | 70 |
| Insoluble polymer | | 0.9 | |

TABLE IV
Same Conditions as in Run No. 1
Time: 4 hours

| Molecular weight | Approx. No. of C atoms | Percent Based on total conversion [a] | Mols bearing a vinyl group |
|---|---|---|---|
| 56 | $C_4$ | 4.5 | ≃100 |
| 84 | $C_6$ | 10.1 | ≥95 |
| 112 | $C_8$ | 11.0 | ≥95 |
| 187 | $C_{13}$ | 8.4 | ≥90 |
| 211 | $C_{15}$ | 8.7 | ≥90 |
| 241 | $C_{17}$ | 6.0 | ≃90 |
| 284 | $C_{20}$ | 8.8 | ≃75 |
| 374 | $C_{27}$ | 25.8 | ≃60 |
| 515 | $C_{37}$ | 8.3 | ≃25 |
| 742 | $C_{53}$ | 4.6 | ≃12 |
| Insoluble polymer | | | |

[a] Total Conversion 31 mols per Liter of Catalyst Solution.

From the Tables III and IV it is apparent that the rate of conversion of ethylene decreases with the time while 13 mols per liters are converted in 1 hour, there are only 31 mols per liter in 4 hours.

It is also apparent that the average molecular weight increases with the conversion; the fraction of molecules bearing vinyl end groups simultaneously decreases, which is undesirable. Thus, the conversion cannot optionally be increased, because with time the already formed α-olefins will be incorporated into the growing chains and inner double bonds will result. A conversion of more than about 30 mols of ethylene per liter of original catalyst solution is not recommended.

TABLE VI.—INFLUENCE OF THE Al/Ti RATIO
Same Conditions as in Run No. 1
Time: 1 hour

| Run Number | Ti, mol/liter, ×10³ | Ratio, Al/Ti | Conversion, mol/liter |
|---|---|---|---|
| 5 | 20 | 2 | 0.1 |
| 1 | 20 | 5 | 13.0 |
| 6 | 20 | 7 | 17.8 |
| 7 | 20 | 10 | 17.3 |
| 8 | 10 | 5 | 4.1 |
| 9 | 10 | 7 | 9.0 |

From the Table VI it is evident that a decrease of the Al/Ti ratio to 2:1 renders the catalyst practically inactive. When the ratio is increased to 7:1 the conversion is considerably improved. A further increase does not bring any improvement of the rate.

From the Table it is further apparent that with a ratio of Al/Ti=7:1, the conversion is proportional to the Ti concentration within the investigated range.

TABLE VIII.—INFLUENCE OF THE SOLVENT

Catalyst, concentration and Al/Ti Ratio are the same as in Run No. 1
Temperature: 5° C.
Pressure: 1 kg./cm.²

| Run Number | Solvent | Percent Oligomer (liquid) | Polymer (solid) |
|---|---|---|---|
| 10 | Benzene | 56 | 44 |
| 11 | Xylene | 88 | 12 |

Aromatic hydrocarbons are expediently used as solvent for the catalyst and the formed polyethylenes. The higher the π-electron density in the aromatic ring and consequently the donor strength of the aromatic solvent, the more formation of undesired solid polymers will be avoided. The amount of such polymers increases with the temperature. The donor strength increases in, for example, the series benzene < toluene < xylene < mesitylene.

Titanium compounds having a high electron affinity are preferred because, e.g., $TiCl_4$, as compared to, e.g., $(C_2H_5O)_3TiCl$, shifts the electron donor-acceptor (EDA) equilibrium Titanium Compound + Aromatic Solvent ⇌ EDA Complex
(Acceptor)         (Donor)

to the right side. Electron donating groups, like, e.g., the ethoxy group will increase the electron density at the titanium, and therefore diminish the tendency to accept electrons. Thus, using, e.g., $(C_2H_5O)_4Ti$, instead of $TiCl_4$, the equilibrium shown above will be shifted to the left. On the other hand, a high electron affinity favors the branching reaction and consequently the formation of undesired vinylidene groups.

By thorough investigation of different systems, it has been proved that under the conditions herein employed,

TABLE V.—INFLUENCE OF ETHYLENE PRESSURE

Same conditions as in Run No. 1

| Run No. | Pressure, kg./cm.² | Time, hrs. | Conversion mol/liter | ≤$C_8$, percent | $C_{10}$-$C_{50}$, percent | Insol., percent | Percent mols bearing a vinyl group ≤$C_8$ | $C_{10}$-$C_{50}$ |
|---|---|---|---|---|---|---|---|---|
| 3 | 3 | 4 | 13.5 | 21.5 | 75.0 | 3.5 | ≤90 | ≃40 |
| 4 | 6 | 4 | 16.4 | 40.7 | 54.6 | 4.8 | ≤90 | ≃70 |
| 1 | 12 | 1 | 13.0 | 32.0 | 67.1 | 0.9 | ≤90 | ≃90 |

Lower pressure is found to be unfavorable, since too many α-olefins will be incorporated and the vinyl content will be smaller. It has also been found that at high pressure (>12 atm.) much insoluble solid polymer will be formed. Under the conditions herein employed, 12 atm. represent about the optimum. At lower temperatures the pressure can be higher.

triethoxy titanium chloride or, generally speaking, a lower trialkoxy titanium chloride is especially suitable.

A modification of the present process for preparing low molecular weight liquid polyethylenes is based on the separation of the low molecular weight α-olefins (1-hexene and 1-octene) after short reaction times, e.g., 10 minutes, from the reaction mixture, e.g., by vacuum distillation.

EXAMPLE 1

Into a dried and evacuated glass flask there are distilled 60 ml. of dried toluene free of oxygen. After addition of $1.2 \times 10^{-3}$ mol of triethoxy titanium chloride and $6 \times 10^{-3}$ mol of ethyl aluminum dichloride (Al/Ti=5) at room temperature, the mixture is introduced into an autoclave. After cooling down to $-20°$ C., ethylene at a pressure of 12 kg./cm.$^2$ is added. Under these conditions the mixture is stirred for 1 hour, the ethylene supply interrupted and the autoclave vented.

The fraction $\leq C_8$ upon filtration of the insoluble is distilled off with the solvent and determined by gas chromatography. The remaining oily fraction is directly determined gravimetrically. There have been converted 22 g. of ethylene. The first separation of the different oligomers according to their chain length yields the following distribution:

| | Percent |
|---|---|
| $\leq C_8$ | 32.0 |
| $C_{10}-C_{50}$ | 67.1 |
| Insoluble | 0.9 |

The fraction $\leq C_8$, according to the infrared analysis, contains not less than 90% of oligomer molecules bearing a vinyl group. This figure is about 85% in the $C_{10}-C_{50}$ fraction.

EXAMPLE 2

The procedure is as in Example 1, however the stirring is for 4 hours. There have been converted 52.6 g. of ethylene. After the usual work-up the following distribution of the chain lengths is obtained:

| | Percent |
|---|---|
| $\leq C_8$ | 25.6 |
| $C_{10}-C_{50}$ | 70.6 |
| Insoluble | 3.8 |

The fraction $\leq C_8$ according to the infrared analysis does not contain less than 90% of oligomer molecules bearing a vinyl group and about 80% in the $C_{10}-C_{50}$ fraction.

EXAMPLE 3

The procedure is as in Example 1, however a ratio of Al/Ti=7 is used instead of Al/Ti=5. There have been converted 32.7 g. of ethylene. After the usual work-up the following distribution of the chain lengths is obtained:

| | Percent |
|---|---|
| $\leq C_8$ | 32.8 |
| $C_{10}-C_{50}$ | 64.0 |
| Insoluble | 3.2 |

The fraction $\leq C_8$ according to the infrared analysis does not contain less than 90% of oligomer molecules bearing a vinyl group and about 70% in the $C_{10}-C_{50}$ fraction.

EXAMPLE 4

The procedure is as in Example 1, however the temperature is kept at $-45°$ C. There have been converted 26 g. of ethylene. After the usual work-up the following distribution of the chain lengths is obtained:

| | Percent |
|---|---|
| $\leq C_8$ | 54.6 |
| $C_{10}-C_{50}$ | 43.5 |
| Insoluble | 1.9 |

The fraction $\leq C_8$ according to the infrared analysis does not contain less than 90% of oligomer molecules bearing a vinyl group and 85% in the $C_{10}-C_{50}$ fraction.

EXAMPLE 5

The procedure is as in Example 2, however the ethylene pressure is maintained at 6 kg./cm.$^2$. There have been converted 26 g. of ethylene. After the usual work-up the following distribution of the chain lengths is obtained:

| | Percent |
|---|---|
| $\leq C_8$ | 40.7 |
| $C_{10}-C_{50}$ | 54.6 |
| Insoluble | 4.8 |

The fraction $\leq C_8$ according to the infrared analysis does not contain less than 90% of oligomer molecules bearing a vinyl group and 70% in the $C_{10}-C_{50}$ fraction.

What I claim is:

1. A process for preparing low molecular weight $\alpha$-olefins having 4 to 50 carbon atoms, characterized in that the reaction of the ethylene is carried out in the presence of a solution consisting of an aluminum compound of the general formula $RAlCl_2$ and a titanium compound of the general formula $(RO)_3TiCl$, where R represents an alkyl group having 1 to 4 carbon atoms, in a molar ratio of 2:1 to 10:1 aluminum to titanium in an aromatic solvent at a temperature in the range of from 0 to $-50°$ C. and at a pressure in the range of from 1 to 20 kg./cm.$^2$.

2. A process of claim 1 wherein the temperature is in the range of $-10$ to $-50°$ C.

3. A process of claim 1, characterized in that the reaction of the ethylene is carried out in the presence of a solution consisting of ethyl aluminum dichloride and triethoxy titanium chloride in a molar ratio of 7:1, respectively, in toluene at a temperature in the range of from $-17$ to $-23°$ C. and at a pressure in the range of from 6 to 12 kg./cm.$^2$.

4. A process of claim 1, characterized in that the concentration of the titanium compound is $1 \times 10^{-3}$ to $50 \times 10^{-3}$ mol/liter of solvent.

5. A process of claim 3, characterized in that the concentration of the titanium compound is $20 \times 10^{-3}$ mol/liter.

6. A process of claim 1, characterized in that the $\alpha$-olefins formed are periodically separately from the reaction mixture.

References Cited

UNITED STATES PATENTS

| 2,907,805 | 10/1959 | Bestian et al. | 260—683.15 |
| 3,168,588 | 2/1965 | White et al. | 260—683.15 |
| 3,441,630 | 4/1969 | Langer et al. | 260—683.15 |

PAUL M. COUGHLAN, JR., Primary Examiner

U.S. Cl. X.R.

252—431; 260—94.9